United States Patent
Eick et al.

(10) Patent No.: US 9,001,615 B2
(45) Date of Patent: Apr. 7, 2015

(54) OSCILLATING FLARED STREAMERS

(75) Inventors: Peter M. Eick, Houston, TX (US); Joel D. Brewer, Houston, TX (US); Frank D. Janiszewski, Richmond, TX (US)

(73) Assignee: ConocoPhillips Company, Houston, TX (US)

(*) Notice: Subject to any disclaimer, the term of this patent is extended or adjusted under 35 U.S.C. 154(b) by 695 days.

(21) Appl. No.: 13/291,774

(22) Filed: Nov. 8, 2011

(65) Prior Publication Data
US 2013/0114372 A1    May 9, 2013

(51) Int. Cl.
*G01V 1/38* (2006.01)

(52) U.S. Cl.
CPC ............ *G01V 1/3817* (2013.01); *G01V 1/3826* (2013.01); *G01V 1/38* (2013.01)

(58) Field of Classification Search
CPC ...... G01V 1/38; G01V 1/3817; G01V 1/3826
USPC ...................................... 367/15–19
See application file for complete search history.

(56) References Cited

U.S. PATENT DOCUMENTS

| | | | |
|---|---|---|---|
| 4,486,863 A | 12/1984 | French | |
| 4,567,582 A | 1/1986 | Kuhn | |
| 4,970,696 A | 11/1990 | Crews et al. | |
| 5,402,745 A | 4/1995 | Wood | |
| 5,430,689 A | 7/1995 | Rigsby et al. | |
| 5,790,472 A * | 8/1998 | Workman et al. | 367/19 |
| 6,691,038 B2 * | 2/2004 | Zajac | 702/14 |
| 7,162,967 B2 * | 1/2007 | Hillesund et al. | 114/344 |
| 7,190,634 B2 | 3/2007 | Lambert et al. | |
| 7,203,130 B1 * | 4/2007 | Welker | 367/16 |
| 7,400,552 B2 | 7/2008 | Moldoveanu et al. | |
| 7,415,936 B2 | 8/2008 | Storteig et al. | |
| 7,450,467 B2 | 11/2008 | Tveide et al. | |
| 7,616,522 B2 | 11/2009 | Rouquette | |
| 7,679,991 B2 | 3/2010 | Ferber | |
| 2003/0067842 A1 | 4/2003 | Sukup et al. | |
| 2006/0227657 A1 * | 10/2006 | Tveide et al. | 367/16 |
| 2008/0285381 A1 | 11/2008 | Moldoveanu et al. | |
| 2009/0147621 A1 | 6/2009 | Hegna | |
| 2009/0262601 A1 * | 10/2009 | Hillesund et al. | 367/16 |
| 2009/0296518 A1 | 12/2009 | MacNeill et al. | |
| 2009/0310439 A1 | 12/2009 | Havan et al. | |
| 2009/0310440 A1 | 12/2009 | Solheim et al. | |
| 2010/0002536 A1 | 1/2010 | Brewer et al. | |
| 2010/0054080 A1 | 3/2010 | Cambois | |
| 2010/0118644 A1 | 5/2010 | Seale et al. | |
| 2010/0118645 A1 | 5/2010 | Welker | |
| 2011/0261646 A1 | 10/2011 | MacNeill et al. | |
| 2012/0002503 A1 * | 1/2012 | Janiszewski et al. | 367/20 |
| 2013/0301384 A1 * | 11/2013 | Hill et al. | 367/15 |

FOREIGN PATENT DOCUMENTS

| | | |
|---|---|---|
| WO | 2009143579 | 12/2009 |
| WO | 2010054186 | 5/2010 |
| WO | WO 2011057324 A1 * | 5/2011 |

OTHER PUBLICATIONS

PCT/US2011/059780 International Search Report (PCT/ISA/210) Dated Nov. 8, 2011.

* cited by examiner

*Primary Examiner* — Ian J Lobo
(74) *Attorney, Agent, or Firm* — ConocoPhillips Company

(57) ABSTRACT

The invention relates to a seismic acquisition process where the streamers are intentionally directed to follow an oscillating sweep pattern behind a tow vessel to counteract the effect of the large gaps between the streamers while acquire a wide sweep of data through each pass over the survey area.

14 Claims, 2 Drawing Sheets

OSCILLATING FLARED STREAMERS

CROSS-REFERENCE TO RELATED APPLICATIONS

None.

STATEMENT REGARDING FEDERALLY SPONSORED RESEARCH OR DEVELOPMENT

None.

FIELD OF THE INVENTION

This invention relates generally to seismic data acquisition in marine environments using towed streamers behind a tow vessel.

BACKGROUND OF THE INVENTION

Marine seismic exploration is used to investigate and map the structures and character of subsurface geological formations underlying a body of water. Marine seismic data is typically gathered by towing seismic sources (e.g. air guns) and seismic receivers (e.g. hydrophones) through a body of water behind one or more marine vessels. As the seismic sources and receivers are towed through the water, the seismic sources generate acoustic pulses that travel through the water and into the earth, where they are reflected and/or refracted by interfaces between subsurface geological formations. The seismic receivers sense the resulting reflected and/or refracted energy, thereby acquiring seismic data that provides information about the geological formations underlying the body of water. Basically a towed seismic source emits a wavefield that propagates down through the earth and is reflected and/or refracted by interfaces between subsurface geological formations then propagates back to the surface where the receivers detect and discretely sample the wavefield.

Typically, an array of thousands of individual seismic receivers is used to gather marine seismic data. The seismic receivers are generally uniformly spaced and attached to streamer cables that are towed behind the marine vessel. It is known that the relative positions of the marine seismic receivers during seismic data acquisition has an impact on the quality and utility of the resulting seismic data. The current teaching is to construct the towing configuration for the streamers such that the ends of the streamers nearest the towing vessel, (commonly known as "near receivers" or "head of the streamers" or "leading end") are all laterally spaced at equal distances along the length of the streamers. Typically, contracts require that the streamers be maintained equally spaced to within 2% of nominal at the head of the streamers or the towing configuration must be adjusted to get "in spec". In this configuration, uniform coverage of the surface and subsurface is achieved by at least the near receivers. It is also known that the wavefield detected by the sensors is poorly sampled in the lateral direction (perpendicular to the streamers) in most streamer configurations because wider spacing size between streamers is necessary to make the cost of the survey affordable and to avoid tangles of the equipment behind the boat. Normally the spacing between streamers is substantially wider than the station spacing down the length of streamer and typically varies from between 4 and 32 to 1. Thus, for example, the standard station spacing along the streamer may be 12.5 meters between hydrophones while the spacing between two adjacent streamers may be 100 meters, to create a ratio of 8 to 1, but station spacing has been known to go as small as 3.125 m. Thus, if the spacing of the streamers at the leading ends of the streamers is large, the wavefield detected by the receivers is highly under sampled in the lateral direction relative to the sampling along the streamer. For clarity, "lateral" is meant to describe perpendicular to the length of the streamer.

However, unpredictable environmental forces such as currents, winds, and seas present in many marine environments can cause the relative positions of marine seismic receivers to vary greatly as they are towed through the water. Therefore, it is becoming common to use steering devices (known as "birds") to be attached to the streamer cables so that the relative positions (both lateral and vertical) of the seismic receivers can be controlled as they are towed through the water. The control of the streamer positions in the lateral direction down the streamer currently helps to maintain the desired spacing between streamers, but provides for new opportunities to shape the streamers to enhance the data collected in a marine survey.

BRIEF SUMMARY OF THE DISCLOSURE

The invention more particularly relates to a process for acquiring seismic data in a marine environment using seismic receivers mounted to streamers in the water following behind a tow vessel. In particular, the process includes installing a series of guidance devices along the length of each streamer with a steerable element and directing the tow vessel to follow a path through the water where the path that the tow vessel has taken is a navigated path through a survey area. The guidance devices are steered to cause the streamers to undertake an oscillating path of back and forth sweeps across the navigated path.

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

Figure 1:
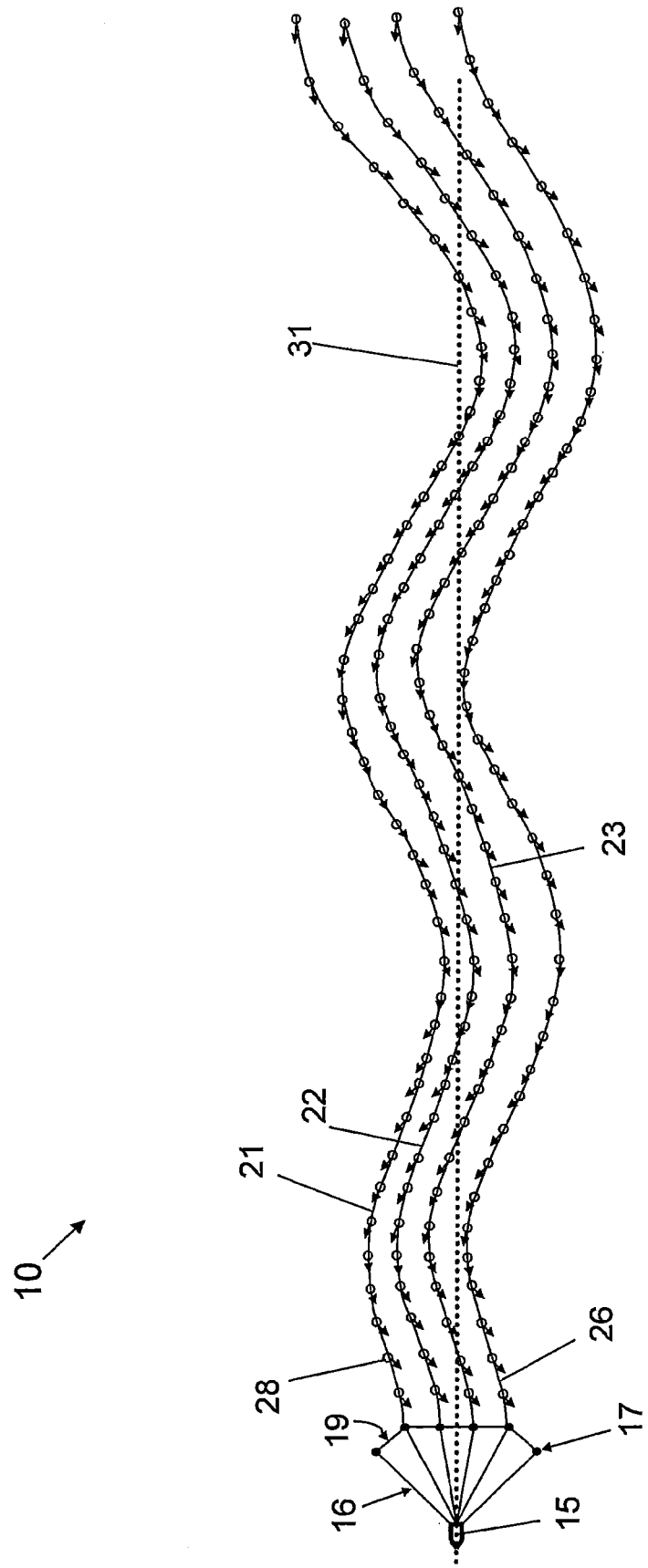
FIG. 1 is top view of a marine seismic system including a tow vessel towing streamers to illustrate the features of the present invention.

As shown in FIG. 1, a marine seismic data acquisition system of the present invention is generally indicated by the arrow 10. The system 10 includes a tow vessel 15 that is shown towing a relatively straight course or navigated path 31 with four streamers 21, 22, 23, and 24 following behind in a serpentine pattern. Each of the streamers may be very long, perhaps as much as ten kilometers in length. Typically, streamers are conventionally operated to follow in equally spaced, straight lines. By directing the streamers 21, 22, 23 and 24 into the serpentine pattern shown in FIG. 1, the sampling of the returning wavefield by the receivers is randomized greatly, thereby reducing sampling voids that occur with straight uniform streamer spacing configurations. Also the serpentine pattern randomizes the positioning of the receivers so that broad gaps caused by the lateral spacing of the streamers is substantially negated. When the serpentine pattern that is clearly shown in FIG. 1 further includes flaring of the streamers, the sampling of the returning wavefield is further randomized. In a flared streamer configuration, the overall width of the streamer configuration at the head of the streamers is less than the overall width of the streamer configuration at the tail of the streamers. In other words, when using the serpentine pattern and flared streamer configuration, the data sample of the returning wavefield is more evenly spaced over the entire survey area, especially in the lateral direction. More even sampling reduces interpolation issues and provides higher potential resolution in the interpretation of the subsurface structures. Moreover, since the frequency content in the fars is reduced due to the Q attenuation effect, the narrower streamer spacing of the near ends of the streamers provides dense high frequency data where it is available. At far ends of the streamers where the Q attenuation effectively eliminates high frequency data thus less dense sampling is required. With streamers that are flared and are farther apart they provide greater confidence that the full survey area is covered with the fewest and smaller gaps.

The streamers 21, 22, 23 and 24, as is conventional, include a series of seismic receivers such as hydrophones that are not shown. The streamers also include a plurality of guidance devices 28, commonly called "birds", spaced along the length of the streamers. The guidance devices 28 include a rudder, vane, hydrofoil or other steerable element that uses the forward motion of the streamer through the water to provide the force needed to steer the devices 28 laterally and therefore cause each streamer to bend into a laterally offset position. Thus, if one considers each streamer to be divisible into many segments along its length, each segment (excluding the first segments) follows a path that is influenced by the position of the segments ahead of and behind it and the tensile force each of the adjacent segments impose on it. The guidance devices 28 create a third force which may move a segment out of line with respect to the adjacent segments. The out of line segment then imposes a tensile force on the following segment which can be enhanced or countered by a following guidance device. According to the present invention, the guidance devices 28 are operated to created an oscillating motion among the streamers 21, 22, 23 and 24 where the streamers sweep back and forth across a centerline path of the streamer through the water all the while seismic energy is recorded returning from the subsea. The centerline path is essentially parallel to the navigated path 31 and is established by the position of the near end of the streamer. As seen in FIG. 1, the back and forth sweep is intended to be at least five percent of the streamer spacing and may exceed ten meters, twenty-five meters, fifty meters and even exceed one hundred meters.

It should also be noted that it is an aspect of the present invention that the streamers 21, 22, 23 and 24 are flared such that the leading ends are spaced closer together than the trailing ends. Considering that cross currents and other forces may cause the long streamers to be deflected to one side or the other of the navigated path of the low vessel, the trailing ends are more likely to broadly cover the navigated path if they are flared. The far ends of the streamers or trailing ends are steered to sweep across a centerline path that is at least five percent wider at the far end than at the near end and may be ten percent, fifteen percent and even twenty percent wider than the streamer spacing from the navigated path at the near ends.

In one arrangement, the streamers 21, 22, 23, and 24 may be towed in a non-oscillating but serpentine patterns such that certain segments remain at an exaggerated lateral spacing from the navigated path 31 of the tow vessel, however, this is not preferred in that it is expected that the streamers moving through the water with a somewhat sideways orientation will create undesirable noise in the water because the streamers are being dragged sideways though the water. The use of this arrangement will be dependent on the noise levels generated by the movement of the streamer cutting through the water instead of sliding through the water and what noise level can be tolerated in the resulting data. As the seismic recorders also record the noise in the water, creating additional noise is generally undesirable.

Figure 2:
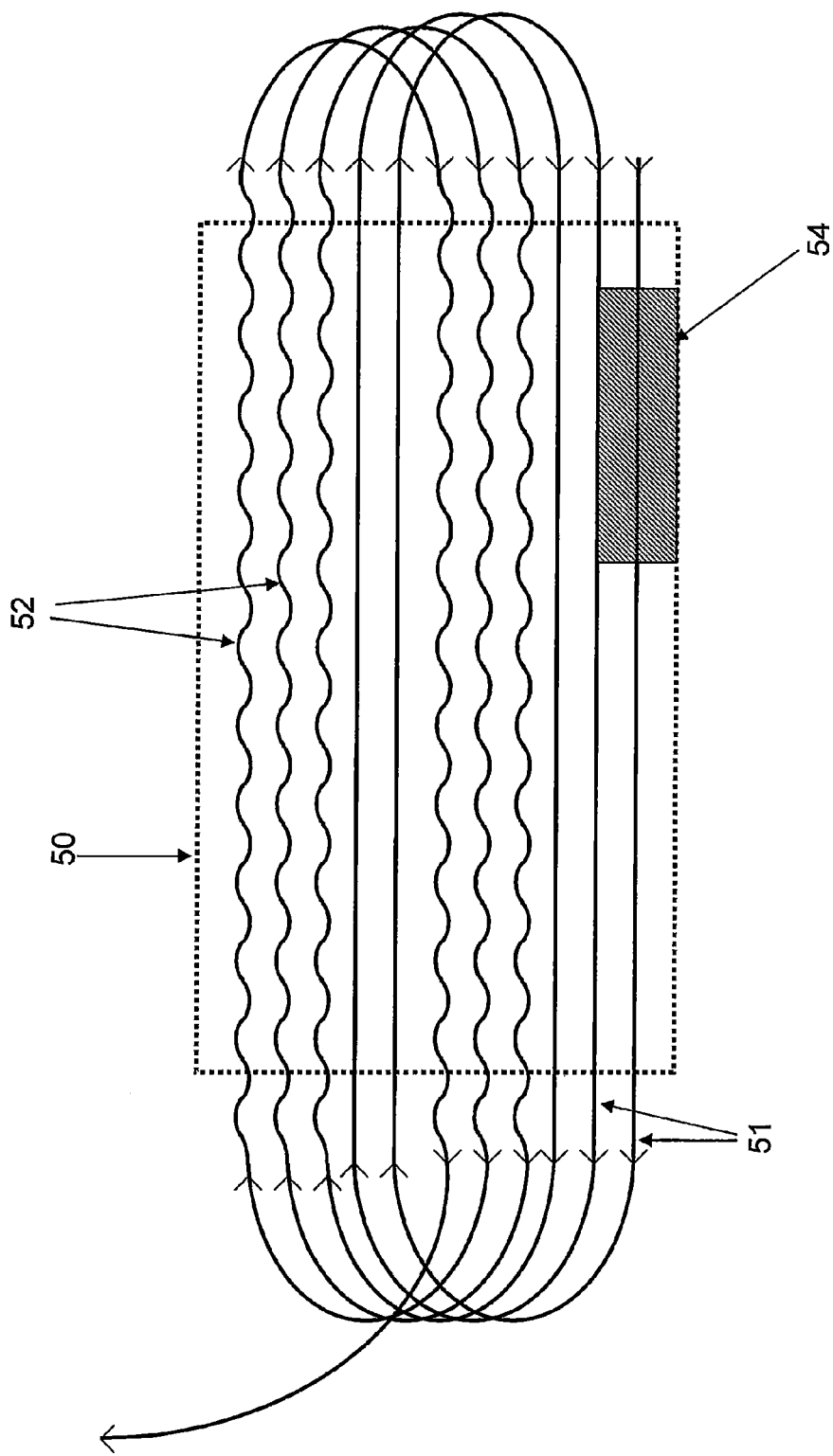
FIG. 2 is top view of survey area showing the path of streamers to be towed through the survey area and acquire marine seismic data.

Thus, in a preferred embodiment, as shown in FIG. 2, the tow vessel 15 follows straight paths 51 through the survey area 50 with large, broad turns outside the survey area. The guidance devices are operated to create a wiggling or oscillating path for the streamers. Each guidance device uses continuous GPS data coupled with an acoustic in-water positioning system to steer a course that follows the segment of the streamer through a back and forth, sinuous path that tends to be more exaggerated near the latter ends of the streamers due to the lower tensile forces of a smaller trailing length of each streamer. The total coverage of the streamers extends much wider over the survey area as shown by Box 54 such that successive passes through the survey area include overlapping of the streamer area. A common midpoint is often calculated for receivers relative to the sources (which are typically towed behind the same tow vessel) and it is not desirable to overlap the common midpoints of successive passes through the survey area 50.

In another embodiment, the tow vessel may initiate the oscillating pattern for the streamers by steering its own sinuous or serpentine path as shown at 52 extending through the survey area. In this arrangement, it is still preferred that the guidance devices carry on and enhance the oscillating pattern in the streamers.

For the sake of clarity, each of the streamers is connected to the tow vessel 15 by tow lines 18 and a lateral guide line 19 is used to maintain the leading end of the streamers to be a design separation distance. Outrigger lines 16 and paravanes or "doors" 17 are used to draw the guide line 19 relatively taught and thereby pull the leading ends of the streamers to their design spacing.

The steering of each guidance device 28 is shown by arrows at each guidance device, and in effect, once the oscillating pattern is initiated within the streamers, the guidance devices 28 follow a counter steer path to sweep out broadly from the navigated path. The counter steer is undertaken to a point where it turns to sweep out laterally in the opposite direction according to an automated instruction provided to each guidance device whether preloaded and calculated at the guidance device or determined remotely, such as on the tow vessel and communicated to the guidance devices 28. The computational activity may take place within the birds themselves or simply provided by communication from a central processing capability on the vessel 15 or from another location. It should be recognized that the steering direction for each guidance device 28 lags behind the steering direction of the guidance device ahead so that the actions for each steering device may be slightly different for all of the devices in the entire array of streamers. This is especially true considering the desire to flare the streamers.

It should also be recognized that the guidance devices 28 need to be coordinated with one another so that adjacent segments of the streamers are sweeping in the same direction so that the streamers are not overlapping, and worse, not entangling.

Typically, at least four streamers are used and it is common to have between 6 and 24 streamers although 10 to 12 is currently the most common currently. Only four streamers are shown for simplicity, but the oscillating pattern may be undertaken with almost any number of streamers.

In a preferred embodiment of the present invention, the oscillating pattern is coupled with a flared streamer arrangement as described in U.S. patent application Ser. No. 12/167,683 filed Jul. 15, 2008 which is incorporated by reference herein. In addition, an arrangement with four or more streamers may have the streamers unequally spaced as shown in U.S. Provisional Patent Application 61/352,098, filed Jun. 7, 2010 which is incorporated by reference herein.

In closing, it should be noted that the discussion of any reference is not an admission that it is prior art to the present invention, especially any reference that may have a publication date after the priority date of this application. At the same time, each and every claim below is hereby incorporated into this detailed description or specification as an additional embodiment of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A process for acquiring seismic data in a marine environment using seismic receivers mounted to streamers in the water following behind a tow vessel, the process comprising:
   a) installing a series of guidance devices along the length of each streamer, each guidance device having with a steerable element;
   b) directing the tow vessel to follow a path through the water where the path that the tow vessel has taken is a non-oscillating navigated path through a survey area; and
   c) steering each of the guidance devices to cause the streamers to undertake an oscillating path of back and forth sweeps across the navigated path.

2. The process according to claim 1 wherein each guidance device uses its hydrofoil to exert a force to steer itself along a path relative to the navigated path and wherein the forces exerted vary over time and the forces concurrently vary between guidance devices.

3. The process according to claim 2 wherein each of the streamers undertake a serpentine shape and follow a serpentine path.

4. The process according to claim 3 wherein the streamers are also flared while following their serpentine paths.

5. The process according to claim 1 wherein the guidance devices along the length of the streamer are steering such that segments of the streamer are on one side of a centerline path while other segments are on the opposite side of a centerline path and the segments that are on one side of the centerline path move to the other side while the segments on the other side move in a serpentine manner to the one side of the centerline path.

6. The process according to claim 5 wherein a plurality of streamers are towed where a lateral spacing is established near the tow vessel and the streamers are steered so as to be further apart at the far ends then they are spaced at the near end.

7. The process according to claim 6 wherein the spacing at the far ends is at least five percent greater than at the near ends.

8. The process according to claim 6 wherein the spacing at the far ends is at least ten percent greater than at the near ends.

9. The process according to claim 6 wherein the spacing at the far ends is at least fifteen percent greater than at the near ends.

10. The process according to claim 6 wherein the spacing at the far ends is at least twenty percent greater than at the near ends.

11. The process according to claim 5 wherein some segments are steered at least ten meters to either side of the centerline path.

12. The process according to claim 5 wherein some segments are steered at least twenty-five meters to either side of the centerline path.

13. The process according to claim 5 wherein some segments are steered at least fifty meters to either side of the centerline path.

14. The process according to claim 5 further including the step of processing the data into a three dimensional model of the geological structures underlying the body of water.

* * * * *